United States Patent
Zhu et al.

(10) Patent No.: US 10,425,842 B2
(45) Date of Patent: Sep. 24, 2019

(54) ACCESS POINT ROAMING METHOD OF WIRELESS NETWORK FOR MOBILE ROBOTS BASED ON PATH SETTING

(71) Applicant: Zhejiang Guozi Robot Technology Co., Ltd., Binjiang District, Hangzhou, Zhejiang (CN)

(72) Inventors: Siyi Zhu, Zhejiang (CN); Yikun Tao, Zhejiang (CN); Lingfen Zhu, Zhejiang (CN); Hongbo Zheng, Zhejiang (CN); Xia Wang, Zhejiang (CN); Xinfeng Du, Zhejiang (CN); Xudong Mi, Zhejiang (CN); Jizhong Shen, Zhejiang (CN)

(73) Assignee: Zhejiang Guozi Robot Technology Co., Ltd., Hangzhou (CN)

( * ) Notice: Subject to any disclaimer, the term of this patent is extended or adjusted under 35 U.S.C. 154(b) by 0 days.

(21) Appl. No.: 15/305,134

(22) PCT Filed: Oct. 8, 2016

(86) PCT No.: PCT/CN2016/101510
§ 371 (c)(1),
(2) Date: Jun. 6, 2017

(87) PCT Pub. No.: WO2018/064818
PCT Pub. Date: Apr. 12, 2018

(65) Prior Publication Data
US 2018/0199213 A1    Jul. 12, 2018

(51) Int. Cl.
*H04B 17/318*    (2015.01)
*H04W 16/18*    (2009.01)
(Continued)

(52) U.S. Cl.
CPC ............ *H04W 24/02* (2013.01); *G05D 1/028* (2013.01); *G05D 1/0212* (2013.01);
(Continued)

(58) Field of Classification Search
CPC ....... H04B 17/318; H04L 61/20; H04W 16/18
(Continued)

(56) References Cited

U.S. PATENT DOCUMENTS

2008/0159230 A1* 7/2008 Cho ................... H04W 36/0011
370/331
2009/0247241 A1* 10/2009 Gollnick ............... G06F 1/1626
455/574

(Continued)

FOREIGN PATENT DOCUMENTS

CN    105722170 A    6/2016
CN    105813221 A    7/2016
(Continued)

*Primary Examiner* — Phong La
(74) *Attorney, Agent, or Firm* — Renner, Otto, Boisselle & Sklar, LLP

(57) ABSTRACT

The present invention discloses a AP switching method for mobile robots based on path setting, including the following steps: install APs in the application environments of mobile robots; control the mobile robots to move along established routes, record the signal strengths of each of the APs on each of the paths of the mobile robots, and determine the AP with the strongest signal strength on each path; configure the MAC addresses of the APs to be connected on each path whereon the mobile robots will move; the mobile robots monitor continuously whether the AP that is connected at the moment coincides with the AP configured for the current path, if not, then switch to the configured AP directly. The present invention can avoid effectively the problem of switching APs excessively frequently, the method is simple and effective, without the need for setting thresholds for
(Continued)

signal strengths, and it can decrease uncertainty effectively, which is valuable in the application environments of mobile robots.

2 Claims, 1 Drawing Sheet

(51) Int. Cl.
*H04W 24/02* (2009.01)
*H04L 29/12* (2006.01)
*G05D 1/02* (2006.01)
*H04W 64/00* (2009.01)
*H04W 88/08* (2009.01)
*H04W 84/00* (2009.01)
*H04W 36/24* (2009.01)

(52) U.S. Cl.
CPC ........... *H04B 17/318* (2015.01); *H04L 61/20* (2013.01); *H04W 16/18* (2013.01); *H04W 64/006* (2013.01); *H04L 61/2038* (2013.01); *H04L 61/6022* (2013.01); *H04W 36/245* (2013.01); *H04W 84/005* (2013.01); *H04W 88/08* (2013.01)

(58) Field of Classification Search
USPC .......................................... 370/252
See application file for complete search history.

(56) References Cited

U.S. PATENT DOCUMENTS

| | | | |
|---|---|---|---|
| 2015/0055622 A1* | 2/2015 | Roh ................. | H04W 36/22 370/331 |
| 2015/0111594 A1 | 4/2015 | Cui et al. | |
| 2015/0304983 A1* | 10/2015 | Krening ............ | H04W 64/003 370/254 |
| 2015/0351084 A1* | 12/2015 | Werb ................. | H04W 4/70 370/329 |
| 2016/0100340 A1 | 4/2016 | Kim et al. | |
| 2016/0353450 A1* | 12/2016 | Miao ................. | H04W 76/14 |
| 2017/0082723 A1* | 3/2017 | Pajovic ............. | G01S 5/0252 |
| 2017/0099630 A1* | 4/2017 | Hassan .............. | H04W 36/06 |
| 2017/0244472 A1* | 8/2017 | Saito ................. | H04B 7/155 |

FOREIGN PATENT DOCUMENTS

| | | |
|---|---|---|
| CN | 105828397 A | 8/2016 |
| CN | 106454861 A | 2/2017 |

* cited by examiner

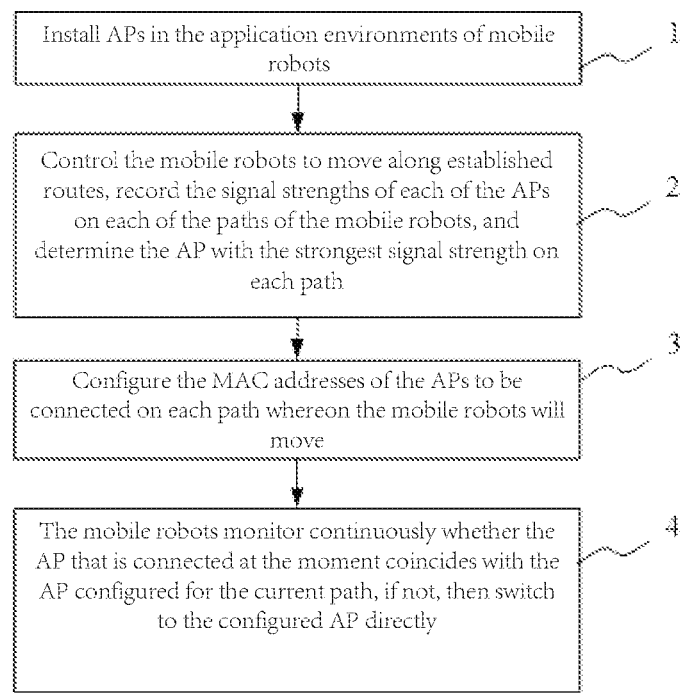

ACCESS POINT ROAMING METHOD OF WIRELESS NETWORK FOR MOBILE ROBOTS BASED ON PATH SETTING

FIELD OF THE INVENTION

The present invention relates to the field of communication technology, more particularly, to AP switching method based on path settings for mobile robots.

DESCRIPTION OF THE PRIOR ART

Mobile terminals (CPE) access the Internet through AP (Wireless Access Point) in wireless networks, since the coverage range of one AP is limited, usually only 50-300 m, its support for mobility of terminals is quite limited, therefore, it is necessary to switch between various APs quickly to shorten network interruption intervals caused by switchover between APs.

With regard to AP switching techniques in the prior art, the switching principles thereof are approximately categorized into two categories: first, compare the signal strengths of a plurality of APs inside the LAN continually, and establish a connection with the AP with the strongest signal strength. Second, set one signal strength threshold in the AC controller, when the signal strength of the AP which is connected for the time being is lower than the threshold, the connection is disconnected automatically, and a new connection is established with the AP with stronger signal strength. The drawbacks with these switching techniques include: due to instabilities of wireless network signals, it tends to switch frequently, and it is difficult to operate. With regard to performing switching by threshold setting, the requirements for setting thresholds are higher, if a plurality of APs are lower than the threshold at the same time, the network will lose connections.

SUMMARY OF THE INVENTION

In view of the above-mentioned drawbacks in the prior art, the present invention provides an AP switching method based on path settings for mobile robots, without the need for setting signal strength threshold, ensuring that mobile robots have better signal strengths of the networks in the whole operating process, solving the problems of frequent switching among a plurality of APs, as well as operational difficulties and the like when wireless network signals are not stable.

The technical solution adopted by the present invention is: an AP switching method based on path settings for mobile robots, comprising the following steps:

Step 1. Install APs in the application environments of mobile robots;

Step 2. Control the mobile robots to move along established routes, record the signal strengths of each of the APs on each of the paths of the mobile robots, and determine the AP with the strongest signal strength on each path;

Step 3. Configure the MAC addresses of the APs to be connected on each path whereon the mobile robots will move;

Step 4. The mobile robots monitor continuously whether the AP that is connected at the moment coincides with the AP configured for the current path, if not, then switch to the configured AP directly.

In a preferred embodiment of the present invention, the installation method of the AP in Step 1 is:

Select appropriate number of the APs according to the operating environments of the mobile robots, the APs are grouped to the same network by LAN cables or fiber cables, the coverage ranges of each two of the APs have an overlapping area.

In another preferred embodiment of the present invention, the number of the APs is 2.

In a preferred embodiment of the present invention, the method for determining the APs with the strongest signal strengths on each path is:

Control the mobile robots to move along established routes, record the signal strengths of each of the APs on each of the paths of the mobile robots, repeat 3-5 times; determine the APs with the strongest signal strengths on each path, while determining whether the signal strengths of the APs satisfy the minimum requirements for signal strengths, if the requirements are satisfied, then the APs with the strongest signal strengths on each path are confirmed; if the requirements are not satisfied, then solve the problem by changing the installation positions of the APs or increasing the number of the APs, until the APs with the strongest signal strengths on the paths are identified.

In another preferred embodiment of the present invention, in Step 3, the MAC addresses are configured by path setting tools of the mobile robots.

In a preferred embodiment of the present invention, in Step 3, the minimum switching times are taken into account while configuring the MAC addresses of the wireless APs, if on the path in the overlapping areas covered by different APs, the APs with the strongest signal strengths vary, the APs whose signal strengths are not the strongest can be selected to be connected with on the basis of satisfying the minimum signal strength.

The present invention can avoid effectively the problem of switching APs excessively frequently, meanwhile as compared with the switching algorithm based on signal strengths, the method is simple and effective, without the need for setting thresholds for signal strengths, and it can decrease uncertainty effectively, which is valuable in the application environments of mobile robots.

BRIEF DESCRIPTION OF THE DRAWINGS

FIG. 1 is a schematic diagram of a flow of an AP switching method for mobile robots based on path setting in a preferred embodiment of the present invention.

DETAILED DESCRIPTION OF THE PREFERRED EMBODIMENTS

Preferred embodiments of the present invention will be set forth in greater detail hereinbelow, so that the advantages and features of the present invention will be readily understood by those skilled in the art, thus the protection scope of the present invention will be defined more definitely and clearly.

An AP switching method based on path settings for mobile robots according to the present invention, with the specific flow chart shown in FIG. 1, comprising the following steps:

Step 1. Install APs in the application environments of mobile robots.

Select appropriate number of the APs according to the operating environments of the mobile robots, preferably, 2, the APs are grouped to the same network by LAN cables or fiber cables, the coverage ranges of each two of the APs have an overlapping area.

Step 2. Control the mobile robots to move along established routes, record the signal strengths of each of the APs on each of the paths of the mobile robots, and determine the AP with the strongest signal strength on each path.

The foregoing processes of recording the signal strengths of APs repeat 3-5 times, determine the APs with the strongest signal strengths on each path, while determining whether the signal strengths of the APs satisfy the minimum requirements for signal strengths, if the requirements are satisfied, then the APs with the strongest signal strengths on each path are confirmed; if the requirements are not satisfied, then solve the problem by changing the installation positions of the APs or increasing the number of the APs, until the APs with the strongest signal strengths on the paths are identified.

Step 3. Configure the MAC addresses of the APs to be connected on each path whereon the mobile robots will move.

By the path setting tools of the mobile robots, configure the MAC addresses of wireless APs to be connected for each path whereon the mobile robots will move. Meanwhile, the minimum switching times are taken into consideration, if on the path in the overlapping areas covered by different APs, the APs with the strongest signal strengths vary, the APs whose signal strengths are not the strongest can be selected to be connected on the basis of satisfying the minimum signal strength.

Step 4. The mobile robots monitor continuously whether the AP that is connected at the moment coincides with the AP configured for the current path, if not, then switch to the configured AP directly.

Ensure that the mobile robots have better signal strength of the network in the whole operating process for data communication between the mobile robots and the dispatching systems or background monitoring clients.

The AP switching method for mobile robots based on path setting disclosed in the present embodiment can avoid effectively the problem of switching APs excessively frequently. Meanwhile, as compared with the switching algorithm based on signal strengths, the method is simple and effective, and it can decrease uncertainty effectively, which is valuable in the application environments of mobile robots.

The foregoing descriptions are only the embodiments of the present invention, which are not intended to limit the protection scope of the present invention, whatever equivalent structures or equivalent flow replacements made utilizing the contents of the specification of the present invention, or being applied in other related technical fields directly or indirectly, are all similarly included in the protection scope of the present invention.

The invention claimed is:

1. An access point (AP) switching method for mobile robots based on path setting, wherein the AP switching method comprises the following steps:

Step 1. installing APs in application environments of the mobile robots;

Step 2. controlling the mobile robots to move along established routes, record a signal strength of each of the APs on each of the paths of the mobile robots, and determine the AP with the strongest signal strength compared with other APs on each path;

Step 3. configuring the MAC addresses of the APs to be connected on each path whereon the mobile robots will move, the MAC addresses are configured by path setting tools of the mobile robots, minimum switching times are taken into account while configuring the MAC addresses of the APs, if on the paths in overlapping areas covered by different APs, the APs with the strongest signal strengths compared with other APs vary, the APs whose signal strengths are not the strongest compared with other APs can be selected to be connected on a basis of satisfying a minimum signal strength;

Step 4. monitoring continuously, by the mobile robots, whether the AP that is connected at the moment coincides with the AP configured for the current path, if not, then switch to the configured AP directly;

wherein the method for determining the APs with the strongest signal strengths compared with other APs on each path is:

control the mobile robots to move along established routes, record the signal strengths of each of the APs on each of the paths of the mobile robots, repeat 3-5 times; determine the APs with the strongest signal strengths on each path, meanwhile determine whether the signal strengths of the APs satisfy a minimum requirements for signal strengths, if the minimum requirements are satisfied, then the APs with the strongest signal strengths on each path are confirmed; if the minimum requirements are not satisfied, then solve the problem by changing the installation positions of the APs or increasing the number of the APs, until the APs with the strongest signal strengths on the paths are identified; and wherein the installation method of the AP in Step 1 is:

select appropriate number of the APs according to the application environments of the mobile robots, the APs are grouped to the same network by LAN cables or fiber cables, the coverage ranges of each two of the APs have an overlapping area.

2. The AP switching method for mobile robots based on path setting according to claim 1, wherein the appropriate number of the APs is 2.

* * * * *